US009975586B2

(12) United States Patent
Shigihara et al.

(10) Patent No.: US 9,975,586 B2
(45) Date of Patent: May 22, 2018

(54) REAR STRUCTURE OF MOTORCYCLE

(71) Applicant: HONDA MOTOR CO., LTD., Tokyo (JP)

(72) Inventors: Takashi Shigihara, Wako (JP); Hirotsugu Ueno, Wako (JP); Toshiaki Kishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/223,994

(22) Filed: Jul. 29, 2016

(65) Prior Publication Data

US 2017/0036711 A1 Feb. 9, 2017

(30) Foreign Application Priority Data

Aug. 7, 2015 (JP) ................................ 2015-157050

(51) Int. Cl.

| | |
|---|---|
| ***B62D 37/02*** | (2006.01) |
| ***B62J 17/00*** | (2006.01) |
| ***B62J 6/04*** | (2006.01) |
| ***B62K 11/04*** | (2006.01) |

(52) U.S. Cl.

CPC ................ *B62D 37/02* (2013.01); *B62J 6/04* (2013.01); *B62J 17/00* (2013.01); *B62K 11/04* (2013.01)

(58) Field of Classification Search

CPC .. B62D 37/02; B62J 6/04; B62J 17/00; B62K 11/04

USPC ................................ 180/218, 219, 220, 225

See application file for complete search history.

(56) References Cited

U.S. PATENT DOCUMENTS

| | | | | |
|---|---|---|---|---|
| 4,582,158 A * | 4/1986 | Hamane ................ | B60K 11/02 | 180/229 |
| 4,633,965 A * | 1/1987 | Tsurumi ................. | F02B 61/02 | 165/41 |
| 4,678,223 A * | 7/1987 | Kishi .................... | B60K 11/08 | 180/219 |
| 4,830,135 A * | 5/1989 | Yamashita ............ | B60K 11/08 | 123/41.7 |
| 6,695,088 B2 * | 2/2004 | Schroeder ............... | B62J 17/00 | 180/229 |
| 7,261,172 B2 * | 8/2007 | Tsukada .................. | B60K 1/00 | 180/229 |

(Continued)

FOREIGN PATENT DOCUMENTS

| | | |
|---|---|---|
| EP | 1790559 A1 | 5/2007 |
| JP | H0361185 A | 3/1991 |

(Continued)

*Primary Examiner* — Tony H Winner

(74) *Attorney, Agent, or Firm* — Birch, Stewart, Kolasch & Birch, LLP

(57) ABSTRACT

A motorcycle with a power unit for reducing the running resistance of a flow of air by effectively straightening the flow of air while ensuring the visibility of a tail light unit. The tail light unit emits light toward the rear of the vehicle and is arranged in a rear cowl which covers a rear part of the body frame at least behind an operator's seat. A straightening plate covers a rear part of a body frame F from below while allowing air flowing from a power unit to the rear to be straightened and discharged to the rear of the vehicle. The straightening plate is fixedly arranged below a rear cowl, which covers the rear part of the body frame from the side and above, behind an operator's seat.

16 Claims, 10 Drawing Sheets

(56) References Cited

U.S. PATENT DOCUMENTS

| | | | | |
|---|---|---|---|---|
| 8,465,083 | B2 * | 6/2013 | Hayashi | B60K 11/06 180/219 |
| 2009/0166120 | A1 * | 7/2009 | Okamoto | B62J 15/00 180/229 |

FOREIGN PATENT DOCUMENTS

| | | | |
|---|---|---|---|
| JP | 4-37089 | U | 3/1992 |
| JP | 2003-81162 | A | 3/2003 |

* cited by examiner

Up
Fr
Rr
Dw
WF
WR
11
12
13
14
15
16
17
18
20
21
22
23F
23R
24
25
26
27
28
29F
29R
30
31
32
34
35
36
37
38
39
40
41
43a
43b
43c
46
50
50a
53
55
55a
63
65
66
67
BF
BR
F
P
L
VP1
VP2
2
3

Fr
Lh
Rh
Rr
46
43c
34
35a
46
4
4
45a
45a
35
45
43b
6
6
47
41
41
42
42
43
44
40

Up
Dw
Rh
Lh
40
43
44
43a
43b
43d
41
42
45
45a
45b
46
47
48
50
53
54
56
57
59
60
61
62
63
64
7
8

40
43a
45
45a
43b
46
35a
Lh
Up
Dw
Rh
43c
34
35
48
43

43a
F
46
17
51
43b
52
43d
45a
47
45
Rh
Up
Dw
Lh
50
56
44
40
45a
43
17
52
43d
51
46
43a 43c
35
35a
57
43b
F
71
17
50
55
56
VP2
47
44
40
43
64
55a
L
41
63
45
74
VP1
WR
75
50a
41a
45b
48
Fr
Up
Dw
Rr
66
67
65

40
43
44
43b
43c
43d
35
35a
46
45a
45
17
18
52
52a
52b
52c
51
57
49
71
F
50
64
41
41a
74
75
48
50a
63
66
67
65
VP1
VP2
L
55
55a
53
WR
Up
Dw
Fr
Rr 40
43
44
47
41
42
48
43a
43b
43d
34
51
54
61
60
62
53
52
52b
52c
50
50a
56
57
Up
Dw
Fr
Rh
Lh
Rr

Up
Dw
Fr
Rh
Lh
Rr
34
43a
43b
60
62
53
49
52
73
61
49
70
43d
59
72
52
49
70
57
47
42
41
50a
43
40
44
71
73
56
74
75
41
50
48
42
43d
74

REAR STRUCTURE OF MOTORCYCLE

CROSS-REFERENCE TO RELATED APPLICATIONS

The present application claims priority under 35 USC 119 to Japanese Patent Application No. 2015-157050 filed Aug. 7, 2015 the entire contents of which are hereby incorporated by reference.

1. FIELD OF THE INVENTION

The present invention relates to a motorcycle, in which a power unit exerting power for driving a rear wheel is mounted on a body frame with a tail light unit for emitting light toward the rear of the vehicle being arranged in a rear cowl, which covers a rear part of the body frame at least behind a rider's seat. More particularly, the invention relates to an improvement in a rear structure of a motorcycle.

2. DESCRIPTION OF BACKGROUND ART

Japanese Utility Model Registration Application Publication No. Hei 4-37089 discloses a rear cowl of a motorcycle that is configured such that air that flows in from side faces of the rear cowl cools an exhaust pipe inside the rear cowl and is discharged from an upper face of the rear cowl.

Although a flow of air needs to be straightened more effectively to reduce the running resistance of a motorcycle, a straightening of the air flow is insufficient in the structure disclosed in Japanese Utility Model Registration Application Publication No. Hei 4-37089. Another conceivable method to reduce running resistance is to reduce the projected area of the rear cowl on a vertical plane extending in the vehicle width direction. However, since the tail light unit needs to be sufficiently large to ensure the visibility of the tail light unit, it is difficult to reduce the running resistance by reducing the aforementioned projected area.

SUMMARY AND OBJECTS OF THE INVENTION

The present invention has been made in view of the foregoing, and aims to provide a rear structure of a motorcycle that can reduce the running resistance by straightening a flow of air more effectively, while ensuring the visibility of a tail light unit.

To achieve the above objective, according to an embodiment of the present invention, a motorcycle is provided in which a power unit for exerting power for driving a rear wheel is mounted on a body frame with a tail light unit, for emitting light toward the rear of the vehicle, being arranged in a rear cowl, which covers a rear part of the body frame at least behind an operator's seat. A straightening plate is provided, which covers the rear part of the body frame from below, while allowing air flowing from the power unit to the rear to be straightened and discharged to the rear of the vehicle, is fixedly arranged below the rear cowl, which covers the rear part of the body frame from the side and above, behind the operator's seat.

Also, according to an embodiment of the present invention, part of a rear edge of the straightening plate is arranged below a rear edge of the tail light unit.

According to an embodiment of the present invention, a hugger fender covering the rear wheel from above is arranged below the straightening plate with the rear edge of the straightening plate being arranged behind a rear edge of the hugger fender.

According to an embodiment of the present invention, an air flow passage allowing air to flow in the longitudinal direction of the vehicle is formed in the rear cowl with an exhaust port of the air flow passage opening toward the rear around the tail light unit.

According to an embodiment of the present invention, a front wall portion facing the vehicle front is provided in the rear cowl behind the operator's seat with a first intake port taking air into the air flow passage from the front is formed in the front wall portion. A second intake port for taking air into the air flow passage from the front is formed in a ceiling wall of the rear cowl, behind the first intake port. A total opening area of the first and second intake ports is set larger than an opening area of the exhaust port wherein the air flow passage is formed such that air flowing in from the first and second intake ports is mixed and discharged from the exhaust port.

According to an embodiment of the present invention, a rear under cover covering the body frame from below under the operator's seat is connected to the straightening plate, in such a manner so as to form air flow holes with the straightening plate and the rear cowl.

According to an embodiment of the present invention, a pad, which can be brought into contact with the lower back of a rider sitting on the operator's seat, is provided on the front wall portion with first intake ports arranged on both sides of the pad being formed in the front wall portion behind a front face of the pad, in such a manner so as to open toward the vehicle front.

According to an embodiment of the present invention, since the straightening plate is fixedly arranged below the rear cowl, the straightening plate can straighten a flow of air. Thus, the running resistance can be reduced while ensuring visibility of the tail light unit.

According to an embodiment of the present invention, part of a flow of air straightened by the straightening plate flows below the rear edge of the tail light unit. Thus, mud and dust thrown up by the rear wheel are less likely to attach to the tail light unit, and visibility of the tail light unit can be increased.

According to an embodiment of the present invention, the straightening plate prevents mud and dust thrown up by the rear wheel from attaching to the tail light unit. Thus, the hugger fender, which is arranged below the straightening plate while covering the rear wheel from above, can be downsized, since the rear edge of the straightening plate is arranged behind the rear edge of the hugger fender.

According to an embodiment of the present invention, the air flow passage allowing air to flow in the longitudinal direction of the vehicle is formed in the rear cowl, such that the exhaust port of the air flow passage opens toward the rear around the tail light unit. Thus, running resistance can be reduced even more, by allowing a flow of air to flow through inside the rear cowl in the longitudinal direction of the vehicle. Also, since a flow of air having flowed through the air flow passage is discharged to the rear from around the tail light unit, mud and dust thrown up by the rear wheel are less likely to attach to the tail light unit, and visibility of the tail light unit can be improved even more.

According to an embodiment of the present invention, the first intake port of the air flow passage opens toward the vehicle front behind the operator's seat, the second intake port of the air flow passage opens toward the vehicle front behind the first intake port, and air flowed in from the first and second intake ports is mixed and discharged from the exhaust port, which has a smaller opening area than the total opening area of the first and second intake ports. Thus, accelerated a flow of air is discharged to the rear from around the tail light unit, so that mud and dust thrown up by the rear wheel are less likely to attach to the tail light unit, and visibility of the tail light unit can be increased.

According to an embodiment of the present invention, the rear under cover covering the body frame from below under the operator's seat is connected to the straightening plate, and the air flow holes are formed with the straightening plate and the rear cowl. Accordingly, a flow of air having passed through the air flow holes flows below the tail light unit. Thus, mud and dust thrown up by the rear wheel are less likely to attach to the tail light unit, and visibility of the tail light unit can be increased.

According to an embodiment of the present invention, the first intake ports of the air flow passage are arranged on both sides of the pad, which is provided in the front wall portion of the rear cowl such that it can be brought into contact with the lower back of the rider sitting on the operator's seat, and the first intake ports open toward the vehicle front behind the front face of the pad. Thus, even when the lower back of the rider sitting on the operator's seat is in contact with the front face of the pad, the lower back of the rider does not block the first intake ports, and therefore a flow of air can be introduced into the air flow passage through the first intake ports, and running resistance can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
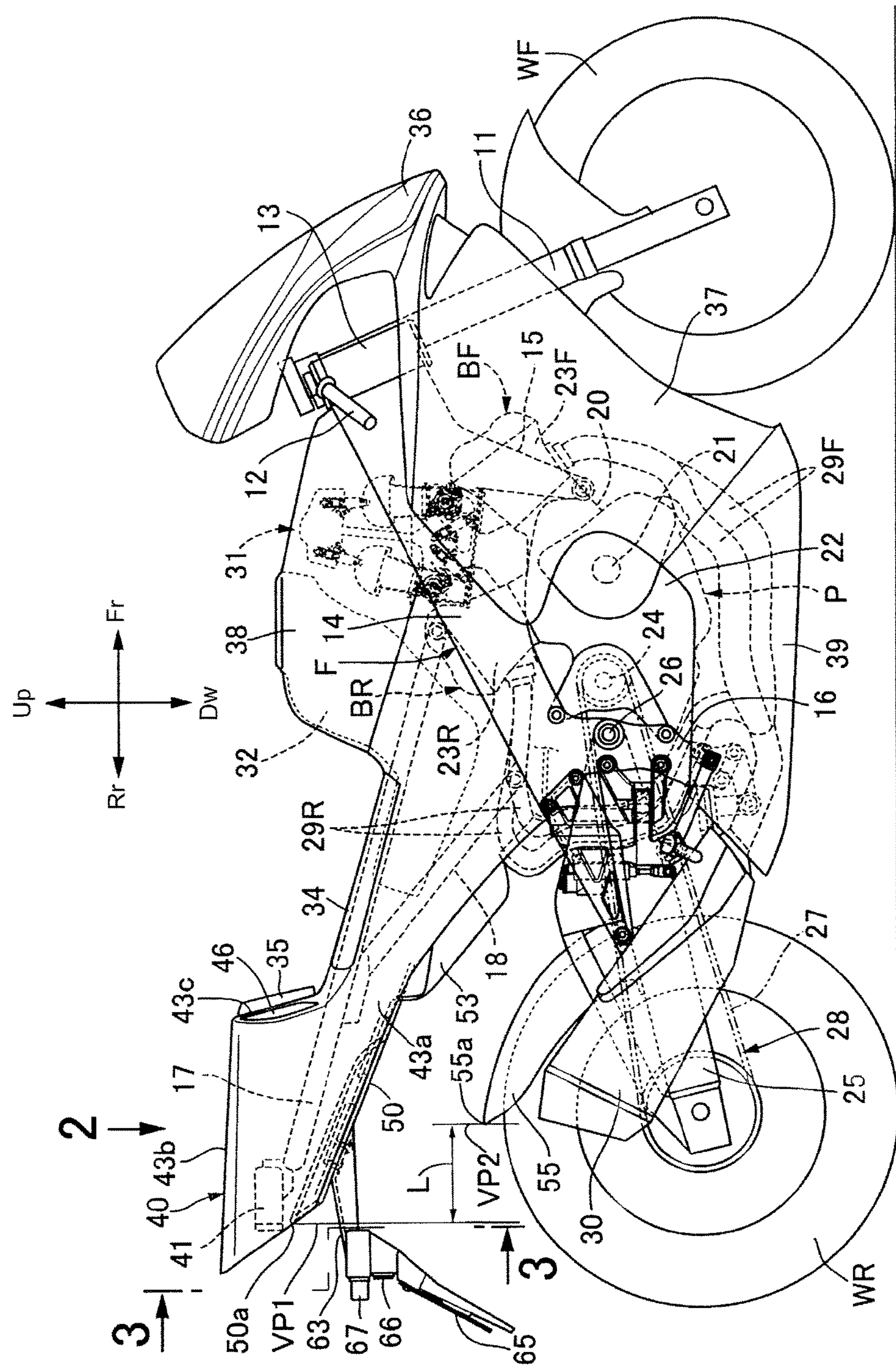
FIG. 1 is a right side view of a motorcycle.

An embodiment of the present invention will be described with reference to the accompanying FIGS. 1 to 9. As illustrated in FIG. 1, a body frame F of a motorcycle includes a head pipe 13, which steerably supports a front fork 11 pivotally supporting a front wheel WF on its lower end part, and a steering handle 12 connected to the front fork 11. A paired right and left main frames 14 extend downwardly toward the rear from the head pipe 13 with a paired right and left down frames 15 extending downwardly toward the rear from front parts of the main frames 14, at a steeper angle than the tilt angle of the main frames 14. A paired right and left pivot frames 16 extending downwardly, while being integrally connected to the rear ends of the main frames 14 with a paired right and left seat rails 17 having front end parts connected to longitudinal center parts of the main frames 14, and extending upwardly toward the rear. A paired right and left auxiliary frames 18 include front end parts connected to rear end parts of the main frames 14 to extend upwardly toward the rear with rear end parts connected to longitudinal center parts of the seat rails 17.

A power unit P exerting power for driving a rear wheel WR is mounted on the body frame F. In the embodiment, the power unit P is configured to include a V4 engine. An engine main body 20 of the engine is supported to the body frame F while including a crankcase 22, which rotatably supports a crankshaft 21 having a center axis parallel to rotation axes of the front wheel WF and rear wheel WR; and a front bank BF and rear bank BR, which are configured in a V shape opened upwardly and connected to a front upper part of the crankcase 22. Each of the front bank BF and rear bank BR is configured of two cylinders.

A gearshift mechanism (not shown) constituting the power unit P with the engine is accommodated in the crankcase 22, and an output shaft 24 of the gearshift mechanism protrudes to the side from a left side face of the crankcase 22. Also, a front end part of a swing arm 25, which pivotally supports the rear wheel WR on a rear end part thereof, is swingably supported to the pivot frame 16 of the body frame F through a spindle 26. Rotary power from the output shaft 24 is transmitted to the rear wheel WR, through a transmission mechanism 28 including an endless drive chain 27.

Paired front bank exhaust pipes 29F are connected to corresponding cylinders, on a front side wall of a cylinder head 23F of the front bank BF, and paired rear bank exhaust pipes 29R are connected to corresponding cylinders, on a rear side wall of a cylinder head 23R of the rear bank BR. The front bank exhaust pipes 29F extend rearwardly while passing front to lower parts of the crankcase 22, and the rear bank exhaust pipes 29R extend downwardly along upper to rear parts of the crankcase 22, are arranged to turn to the lower side of the crankcase 22, so that the front bank exhaust pipes 29F and the rear bank exhaust pipes 29R are joined below a rear part of the crankcase 22, and are connected to an exhaust muffler 30 arranged on the right side of the rear wheel WR.

An intake system 31, which is connected to the cylinder heads 23F, 23R of the front bank BF and the rear bank BR, is arranged between the banks BF, BR, and a fuel tank 32 supported by the main frames 14 is arranged behind the intake system 31 and above the engine main body 20. Also, an operator's seat 34, which is arranged in the rear obliquely upper direction of the power unit P, is supported to the seat rails 17 of the body frame F. The fuel tank 32 is formed such that its rear part extends toward a lower part of the operator's seat 34.

A front cowl 36 covers parts of the steering handle 12 and head pipe 13 from the front with paired right and left front side cowls 37 covering a front part of the power unit P from both sides in the vehicle width direction. A top cowl 38 covers a top part of the power unit P and a top part of the fuel tank 32, from above and both sides in the vehicle width direction with a lower side cowl 39, which is continuous with the front side cowls 37, covers a lower part of the power unit P from both sides in the vehicle width direction. A rear cowl 40, which is continuous with the top cowl 38, covers a rear part of the body frame F with the front cowl 36, the front side cowls 37, the top cowl 38, the lower side cowl 39, and the rear cowl 40 being supported to the body frame F.

Figure 2:
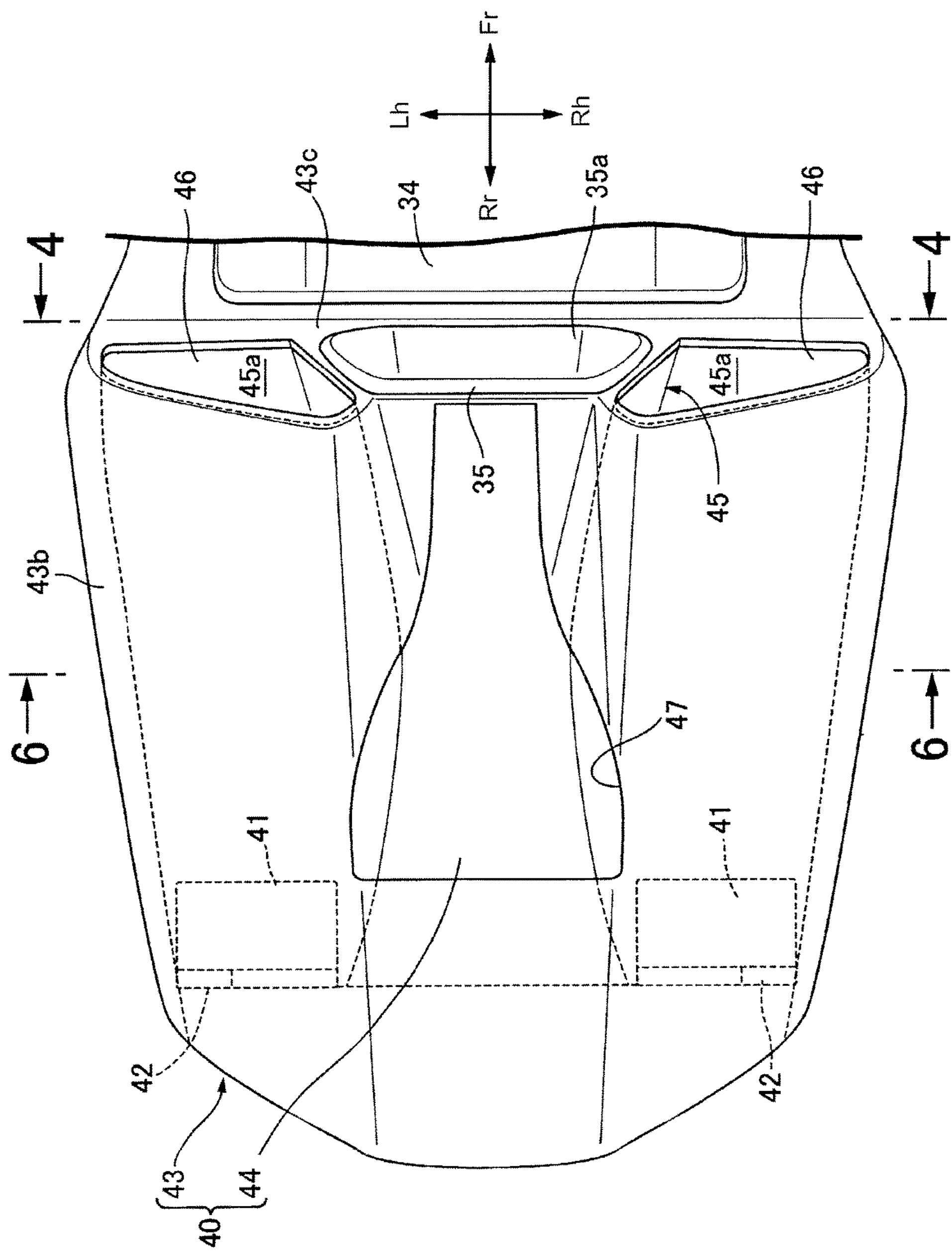
FIG. 2 is a view on arrow 2 of FIG. 1.
Figure 3:
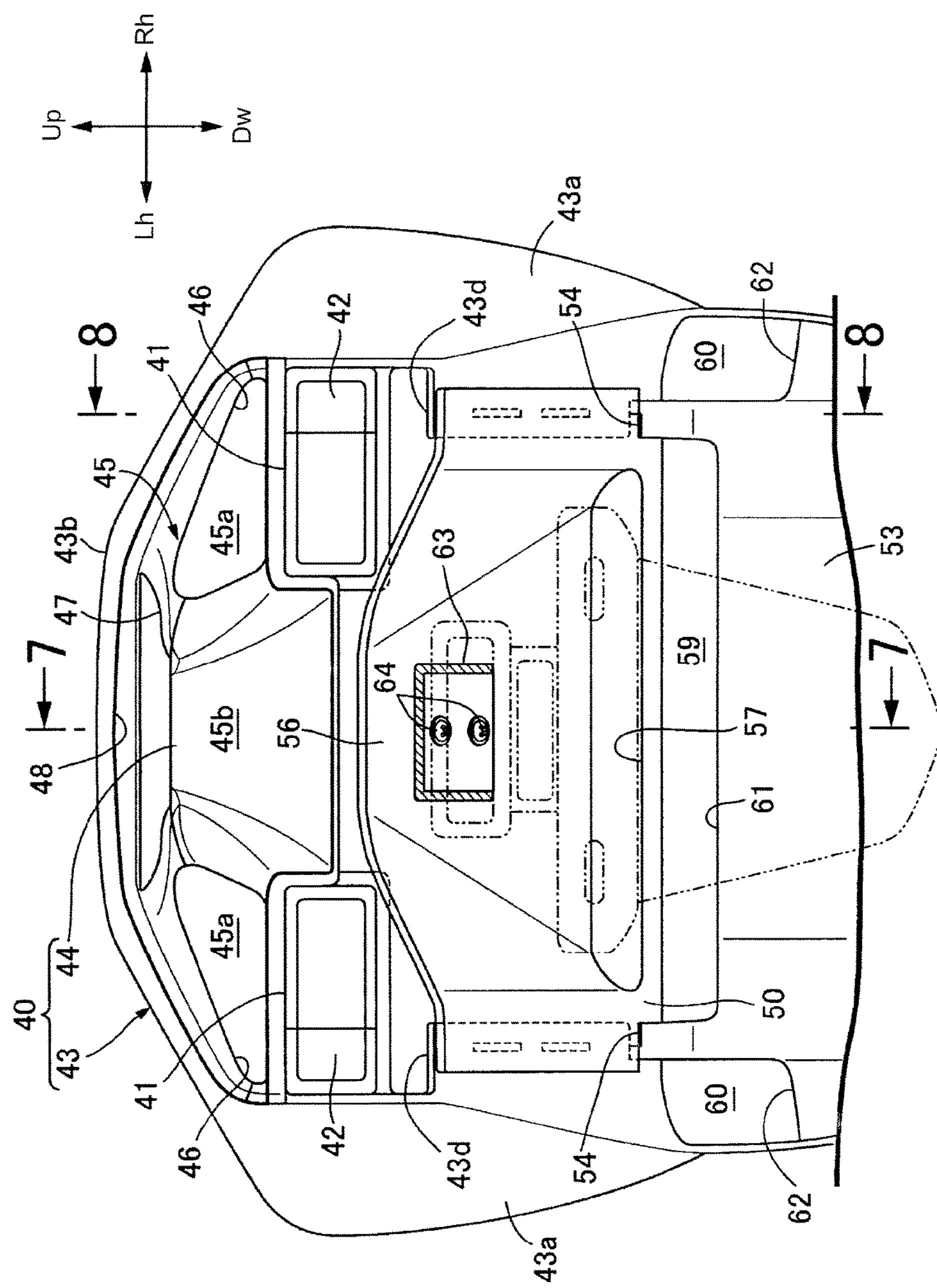
FIG. 3 is an arrow view taken along line 3-3 of FIG. 1.
Figure 4:
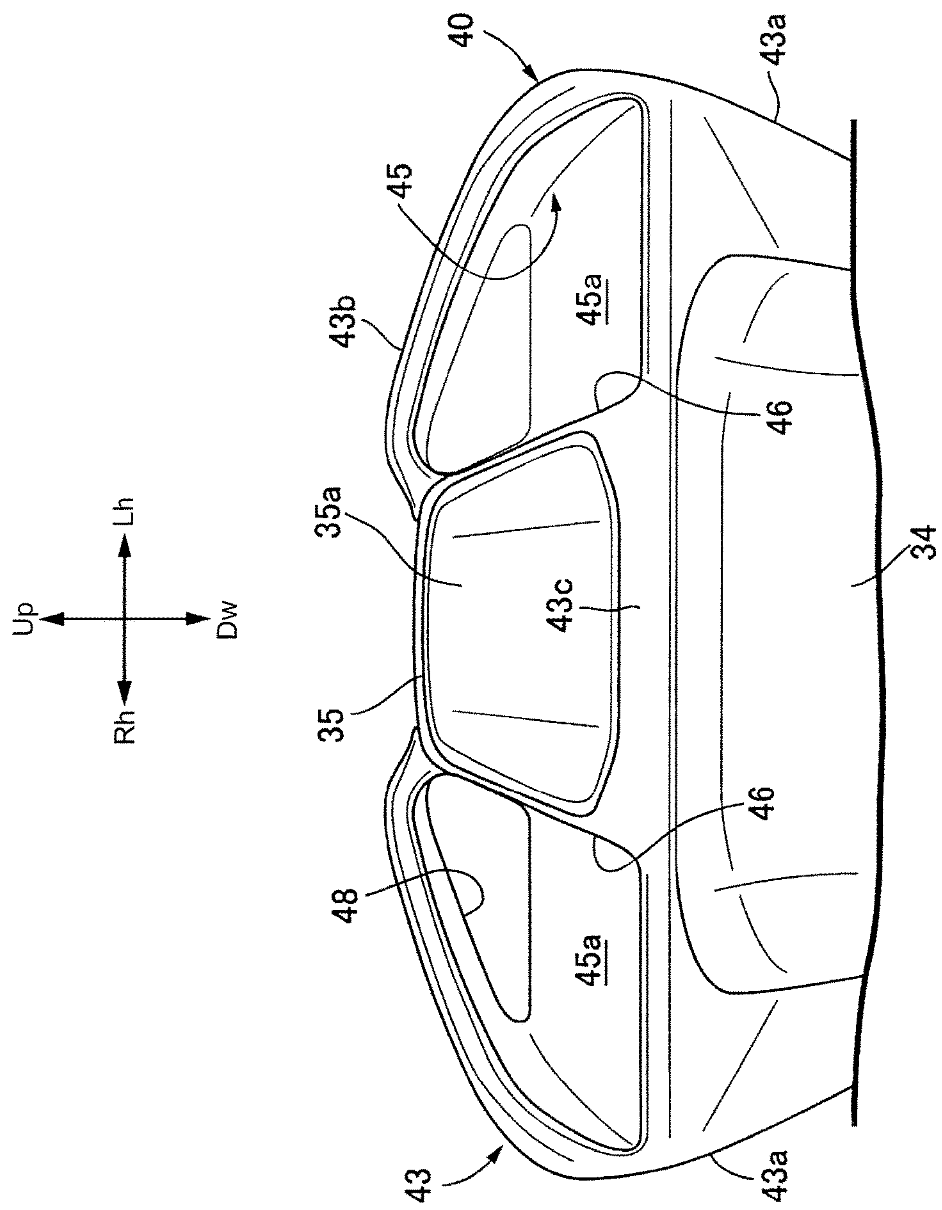
FIG. 4 is an arrow view taken along line 4-4 of FIG. 2.
Figure 5:
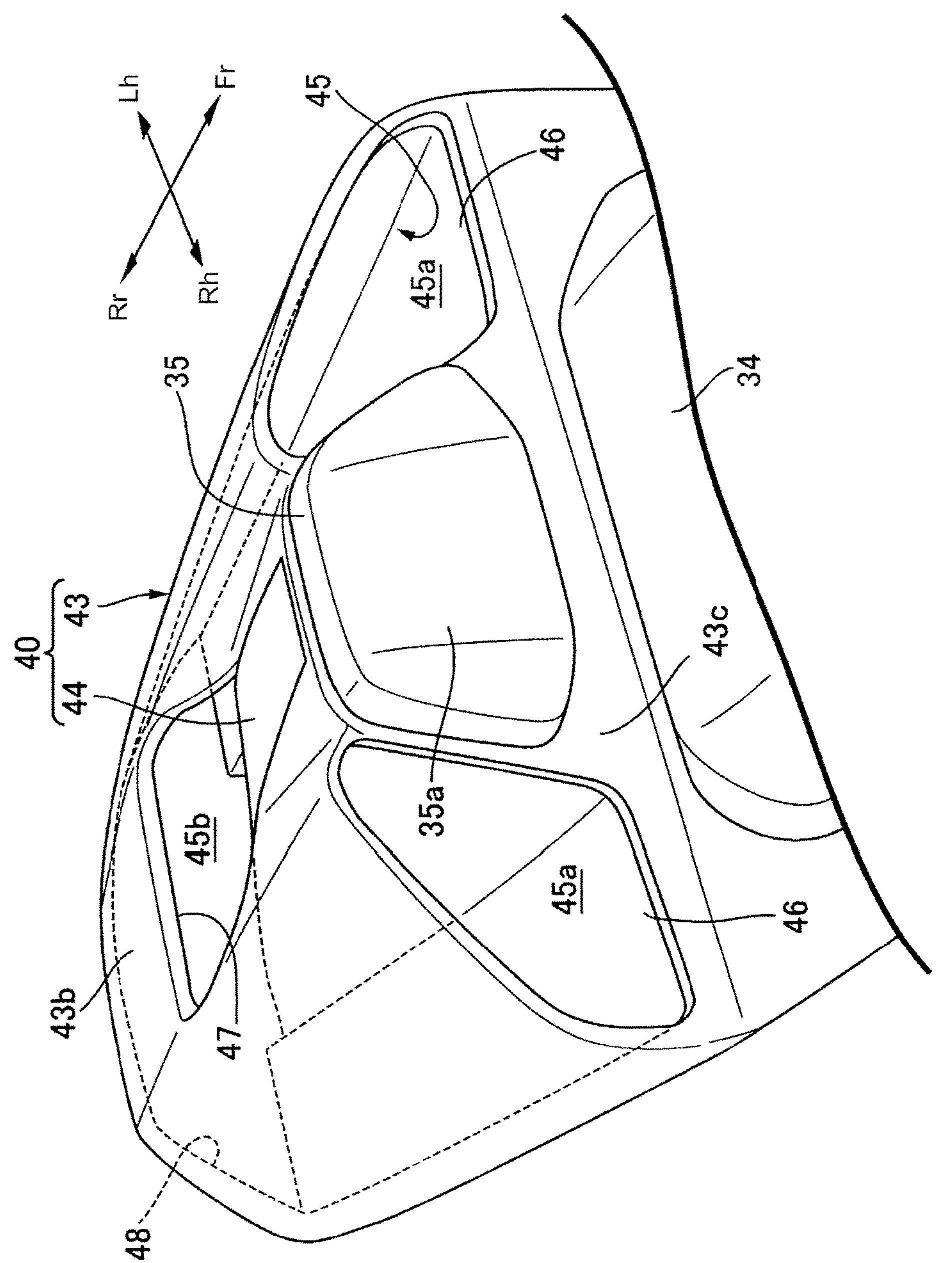
FIG. 5 is an exploded perspective view of a seat part.
Figure 6:
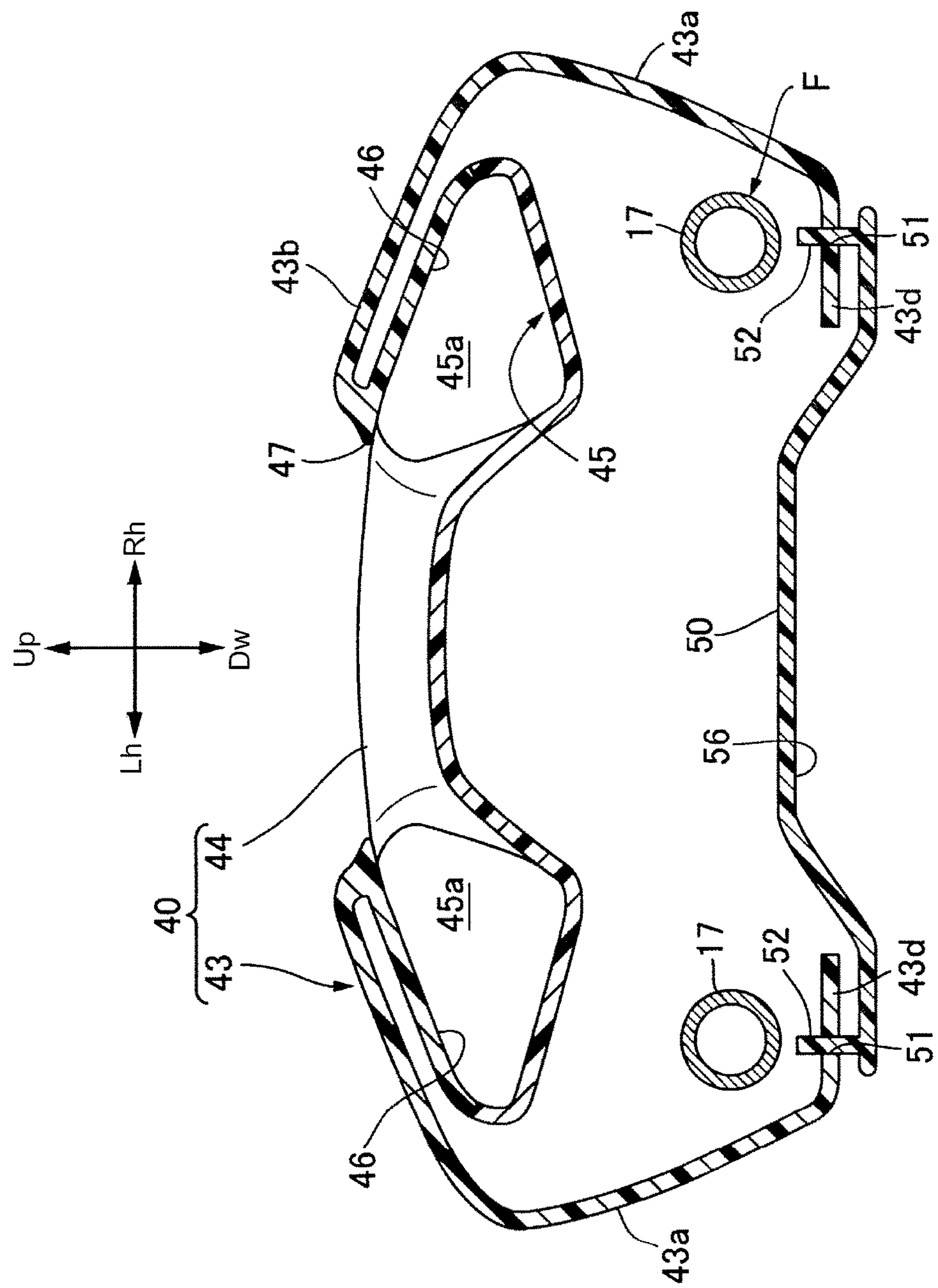
FIG. 6 is a perspective view of a rear part of a rear cowl, as viewed from the front obliquely right upper direction.

Also referring to FIGS. 2 and 3, the rear cowl 40 covers the rear part of the body frame F, at least behind the operator's seat 34. In the embodiment, the rear cowl is formed to cover rear parts of the seat rails 17 and auxiliary frames 18 of the body frame F from the side and above, in an area behind the operator's seat 34, and also to cover the seat rails 17 and the auxiliary frames 18 from the side, in an area below the operator's seat 34 and between a front end part of the operator's seat 34 and the top cowl 38. Paired right and left tail light units 41, which emit light toward the rear of the vehicle, are arranged in a rear part of the rear cowl 40.

Also referring to FIGS. 4 to 8, the rear cowl 40 is formed of a rear cowl main body 43 made of synthetic resin, and a cover member 44 made of synthetic resin and connected to the rear cowl main body 43.

The rear cowl main body 43 includes, as one body, side cover portions 43*a* covering rear parts of the seat rails 17 and auxiliary frames 18 from the side, behind the operator's seat 34, and covering the seat rails 17 and the auxiliary frames 18 from the side, from below the operator's seat 34 to the front end part of the operator's seat 34; a top cover portion 43*b* connecting the paired right and left side cover portions 43*a* and covering the seat rails 17 from above, behind the operator's seat 34; and a front wall portion 43*c* facing the vehicle front behind the operator's seat 34, and connected to the front end of the top cover portion 43*b*. The top cover portion 43*b* is curved in such a manner as to bulge upwardly. The cover member 44 is joined to the top cover portion 43*b* of the rear cowl main body 43, from below.

An air flow passage 45 allowing air to flow in the longitudinal direction of the vehicle is formed in the rear cowl 40, behind the operator's seat 34. In the embodiment, the air flow passage 45 is formed of paired right and left first passage portions 45*a* extending in the longitudinal direction of the vehicle, and a second passage portion 45*b* arranged between the paired right and left first passage portions 45*a* and extending in the longitudinal direction of the vehicle. In other words, the top cover portion 43*b* of the rear cowl main body 43 and the cover member 44 are joined, in such a manner so as to form the paired right and left first passage portions 45*a* and the second passage portion 45*b* between the first passage portions 45*a*, between the top cover portion 43*b* and the cover member 44.

Figure 8:
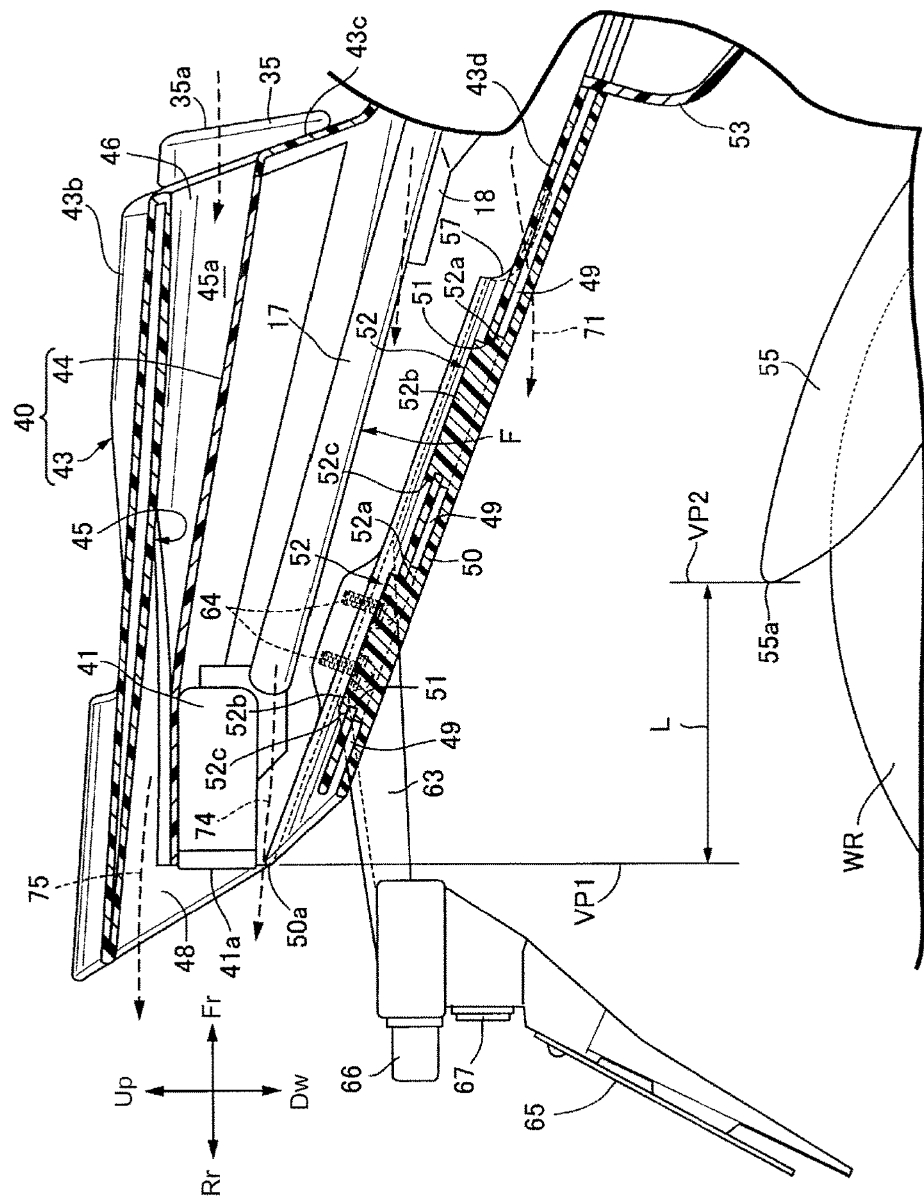
FIG. 8 is a cross-sectional view taken along line 8-8 of FIG. 3.

Paired right and left first intake ports 46, which open toward the vehicle front to be continuous with the first passage portions 45*a* of the air flow passage 45, are formed in the front wall portion 43*c* of the rear cowl 40, behind the operator's seat 34. Moreover, a pad 35, which can be brought into contact with the lower back of a rider sitting on the operator's seat 34, is provided on the front wall portion 43*c*. As illustrated in FIG. 8, the first intake ports 46 arranged on both sides of the pad 35 are formed in the front wall portion 43*c*, such that they open toward the vehicle front behind a front face 35*a* of the pad 35.

A second intake port 47, which continues into the second passage portion 45*b* of the air flow passage 45, is formed in a ceiling wall of the rear cowl 40, behind the first intake ports 46. In the embodiment, the second intake port 47 is formed between the top cover portion 43*b* of the rear cowl main body 43 and the cover member 44, in such a manner so as to open in a center part of the top cover portion 43*b*.

Moreover, the second intake port 47 also continues into longitudinal center parts of the paired right and left first passage portions 45*a*. Thus, the air flow passage 45 is formed such that air flowed in from the first intake ports 46 and the second intake port 47 is mixed, and discharged from an exhaust port 48.

The tail light unit 41 is configured to include an indicator 42 on one side in its width direction. The tail light units are accommodated inside the rear part of the rear cowl 40 on both sides in the vehicle width direction, such that the indicators 42 are positioned on outer end parts in the vehicle width direction. The tail light units 41 are respectively supported to rear end parts of the paired right and left seat rails 17.

The exhaust port 48 of the air flow passage 45 is formed in the rear edge of the rear cowl 40, in such a manner so as to open toward the rear around the paired right and left tail light units 41. Of the rear edge of the rear cowl 40, parts except for the paired right and left tail light units 41 open toward the rear as the exhaust port 48. Moreover, the opening area of the exhaust port 48 is set smaller than the total opening area of the paired right and left first intake ports 46 and the second intake port 47.

Figure 9:
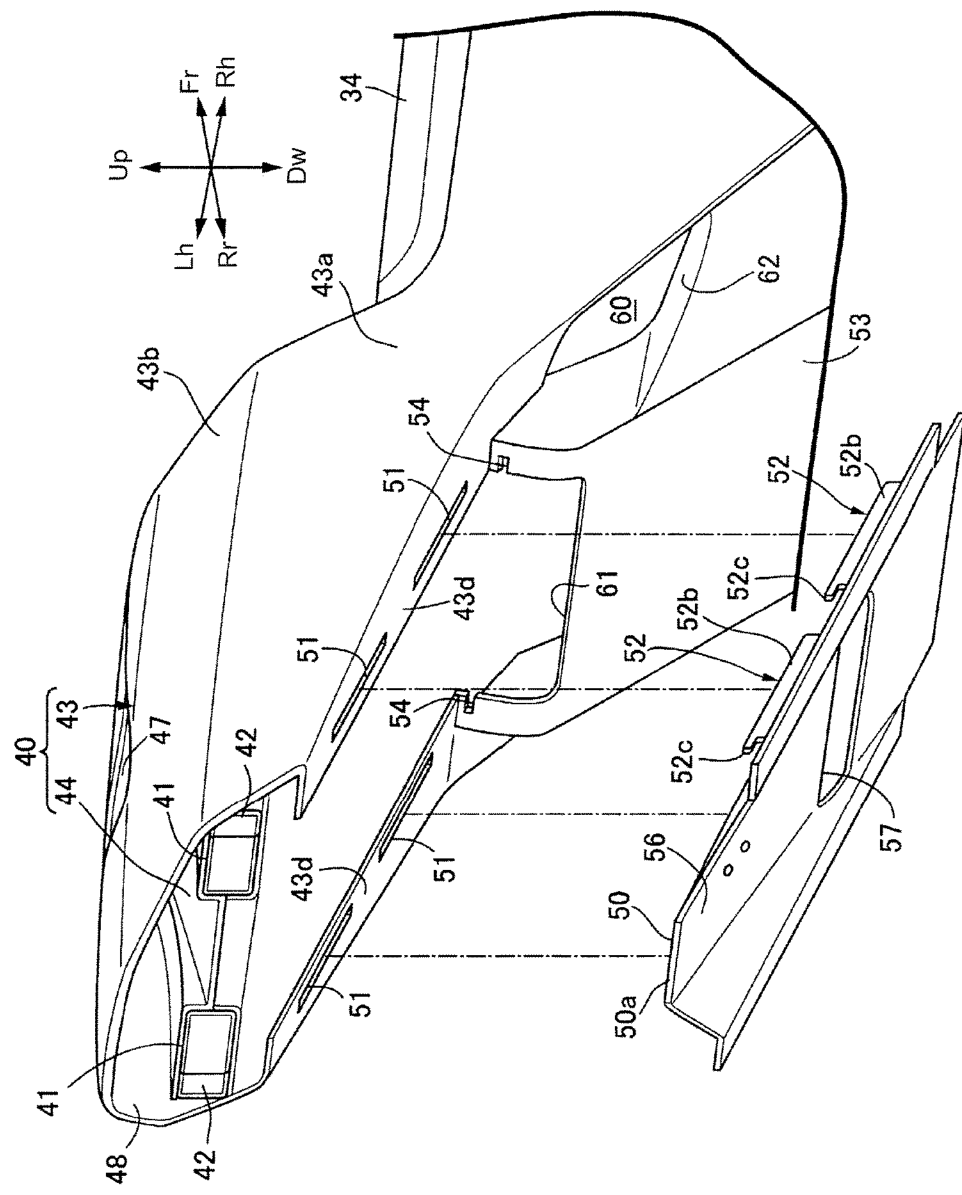
FIG. 9 is an exploded perspective view of the rear cowl and a straightening plate.

Also referring to FIGS. 9 and 10, a straightening plate 50, which covers a rear part of the body frame F from below, while allowing air flowing from the power unit P to the rear to be straightened and discharged to the rear of the vehicle, is fixed to a lower part of the rear cowl 40. In the embodiment, the straightening plate 50, which is tilted upwardly toward the rear, is fixedly arranged to cover rear parts of the paired right and left seat rails 17, and rear parts of the paired right and left auxiliary frames 18 from below.

Supporting flange portions 43*d*, on which both end parts of the straightening plate 50 in the vehicle width direction can be brought into contact from below, are integrally formed with lower end parts of the paired right and left side cover portions 43*a* of the rear cowl 40, in such a manner so as to project inwardly in the vehicle width direction. Longitudinally long and rectangular supporting holes 51 are formed in the supporting flange portion 43*d*, at two points spaced apart in the longitudinal direction. Meanwhile, flat plate-shaped protrusions 52, which extend long in the longitudinal direction to be inserted and engaged with the supporting holes 51, are integrally formed to protrude from both end parts in the vehicle width direction of the straightening plate 50. Each of the protrusions 52 is formed to have, as one body, a contact edge 52*a* facing upwardly to come into contact with a lower face of the supporting flange portion 43*d*, an insertion plate portion 52*b* inserted into the supporting hole 51, and an engagement claw portion 52*c* protruding rearwardly from the rear end of the insertion plate portion 52*b* to be engaged with an upper face of the supporting flange portion 43*d*. Inserting and engaging these protrusions 52 with the supporting holes 51 engages and supports the straightening plate 50 to the rear cowl 40, while forming first flow holes 49, which are arranged at the front and rear of each protrusion 52, between the straightening plate and the supporting flange portion 43*d* of the rear cowl 40.

Meanwhile, a rear under cover 53 arranged below the operator's seat 34 is attached to the body frame F in front of the straightening plate 50, while covering the seat rails 17 and the auxiliary frames 18, which are the rear part of the body frame F, from below, and covering a rear part of the fuel tank 32 from below. Supporting concave portions 54, through which both end parts in the vehicle width direction of a front part of the straightening plate 50 can be inserted to be sandwiched between the supporting flange portions 43*d* of the rear cowl 40, are formed in both end parts in the vehicle width direction of a rear end part of the rear under cover 53. Thus, the front end part of the straightening plate 50 is fastened to the rear under cover 53.

Figure 7:
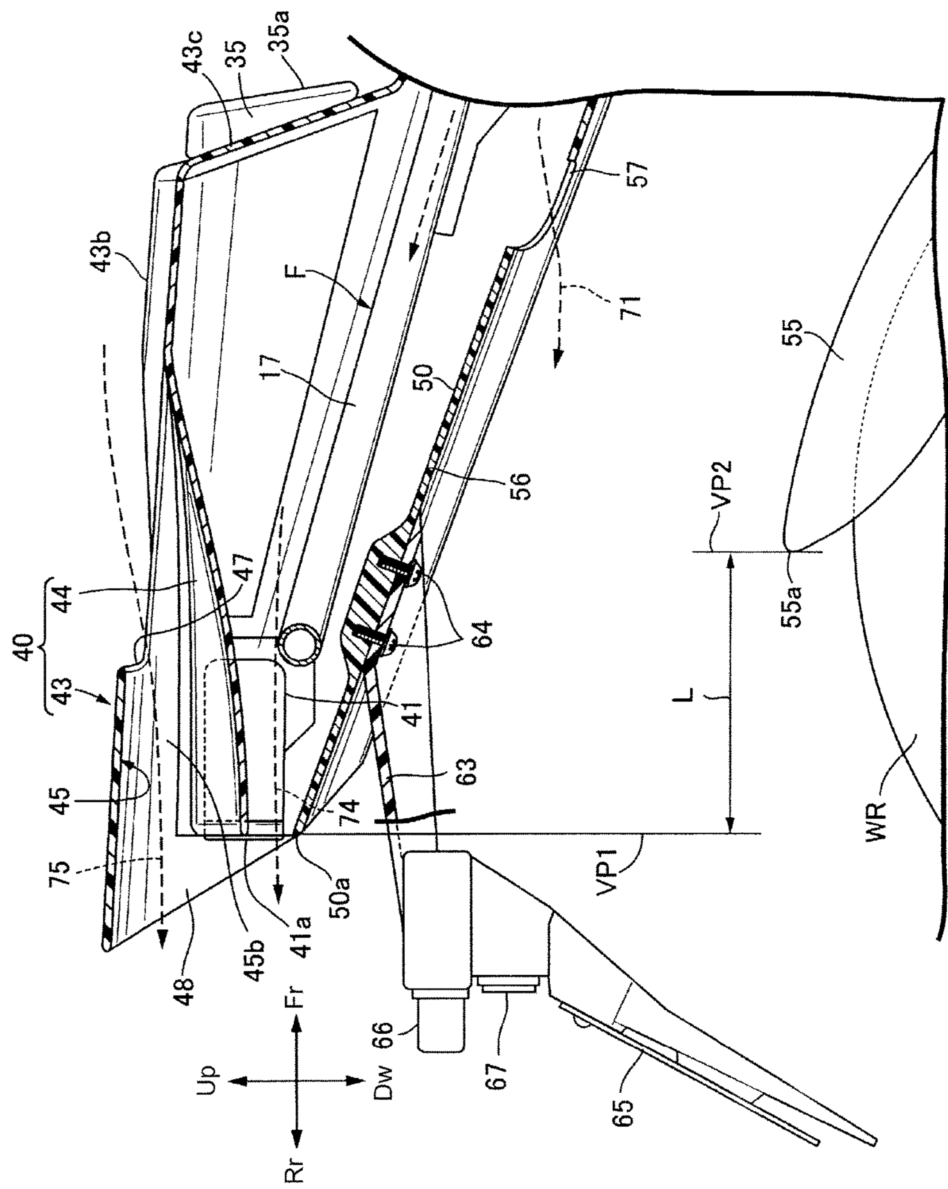
FIG. 7 is a cross-sectional view taken along line 7-7 of FIG. 3.

Accordingly, the straightening plate 50 is fixedly arranged below the rear cowl 40, by being engaged and supported to the rear cowl 40, and being connected to the rear under cover 53. As shown in FIGS. 7 and 8, part of a rear edge 50*a* of the straightening plate 50 is arranged below rear edges 41*a* of the tail light units 41.

Also, a hugger fender 55 covering the rear wheel WR from above is arranged below the straightening plate 50, and the rear edge 50*a* of the straightening plate 50 is arranged behind a rear edge 55*a* of the hugger fender 55. In other words, as shown in FIGS. 1, 7, and 8, a vertical plane VP1, which is perpendicular to the longitudinal direction of the vehicle and passing through the rear edge 50*a* of the straightening plate 50, is positioned behind a vertical plane VP2, which is perpendicular to the longitudinal direction of the vehicle and passing through the rear edge 55*a* of the hugger fender 55, with a distance L in between.

The cross-sectional shape of the straightening plate 50 is formed such that a groove 56, which extends in the longitudinal direction of the vehicle and deepens toward the rear, is formed in a center part on a lower face of the straightening plate 50. A second flow hole 57, which is opened in a longitudinal center part of the groove 56, is provided in the straightening plate 50. Also, in a rear end part of the rear under cover 53, a first concave portion 61, which forms a third flow hole 59 with the straightening plate 50, is provided at the center, and paired right and left second concave portions 62, which form paired right and left fourth flow holes 60 with the rear cowl 40, are provided on the right and left.

Figure 10:
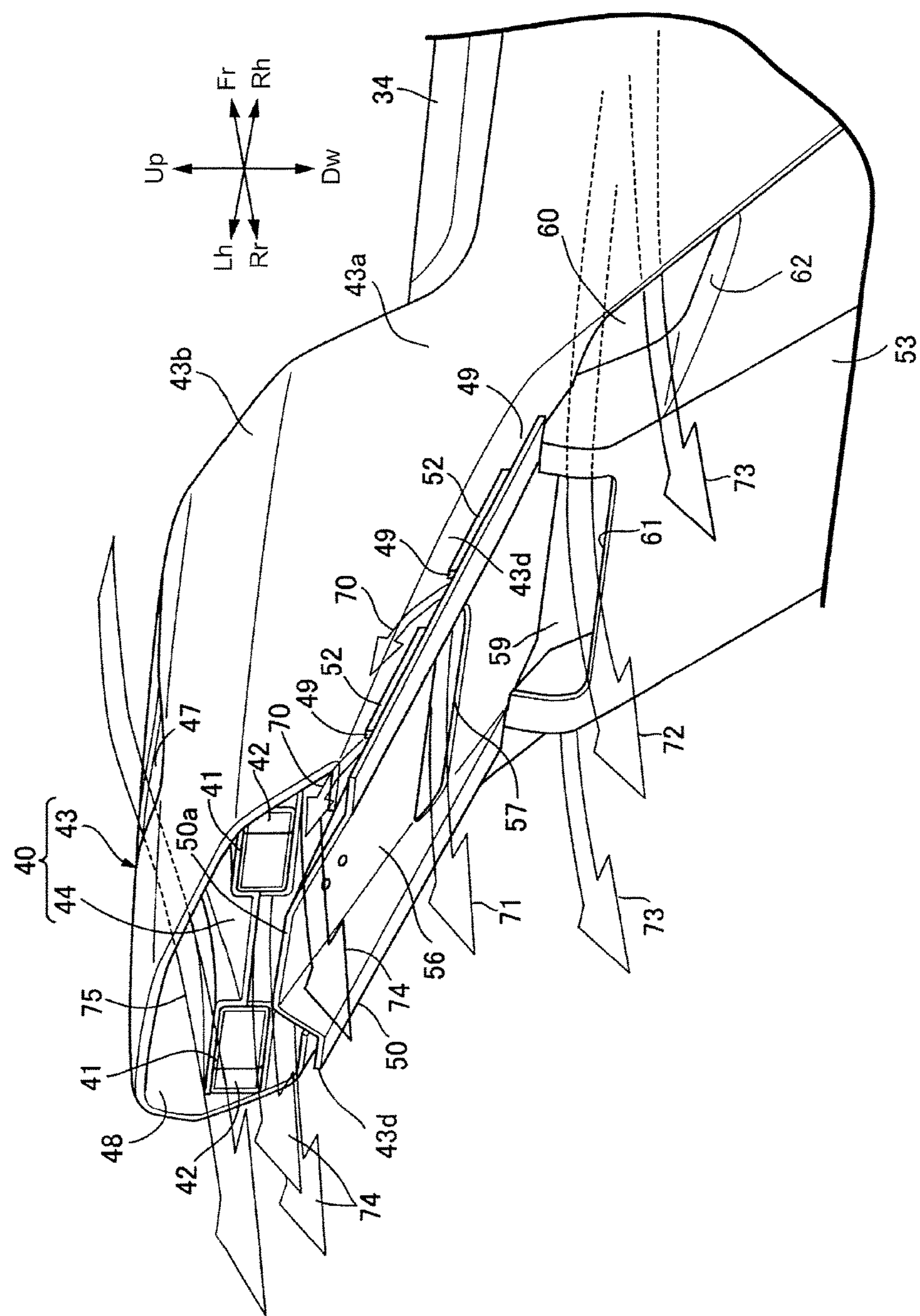
FIG. 10 is a perspective view of a state where the straightening plate is attached to the rear cowl.

A flow of air from the power unit P flows rearwardly inside the rear cowl 40, and is discharged to the rear after flowing through the first flow holes 49 as indicated by arrows 70 (see FIG. 10), is discharged to the rear after passing through the second flow hole 57 as indicated by arrow 71 (see FIGS. 7, 8, and 10), and is discharged to the rear after passing through the third and fourth flow holes 59, 60 as indicated by arrows 72, 73 (see FIG. 10).

A license plate bracket 63, which protrudes further to the rear than the rear end of the rear cowl 40, is attached to a center part in the vehicle width direction of the straightening plate 50 with paired screw members 64, behind the second flow hole 57. A license plate 65 is attached to the license plate bracket 63. A reflector 66 and a license plate lamp 67 are also provided in the license plate bracket 63.

Next, effects of the embodiment will be described. The tail light units 41 for emitting light toward the rear of the vehicle are arranged in the rear cowl 40, which covers the rear part of the body frame F from the side and above, behind the operator's seat 34. Also, the straightening plate 50, which covers the rear part of the body frame F from below, while allowing air flowing from the power unit P to the rear to be straightened and discharged to the rear of the vehicle, is fixedly arranged below the rear cowl 40. Thus, the straightening plate 50 can straighten a flow of air, and reduce running resistance while ensuring the visibility of the tail light units 41. Moreover, since a flow of air heated by the power unit P is discharged to the rear while being guided by the straightening plate 50, the power unit P can be cooled effectively.

Also, part of the rear edge 50*a* of the straightening plate 50 is arranged below the rear edges 41*a* of the tail light units 41. Thus, a flow of air straightened by the straightening plate 50 flows below the rear edges 41*a* of the tail light units 41 as indicated by arrows 74 (see FIGS. 7, 8, and 10), so that mud and dust thrown up by the rear wheel WR are less likely to attach to the tail light units 41, and visibility of the tail light units 41 can be increased.

Also, the hugger fender 55 covering the rear wheel WR from above is arranged below the straightening plate 50, and the rear edge 50*a* of the straightening plate 50 is arranged behind the rear edge 55*a* of the hugger fender 55. Thus, the straightening plate 50 can prevent mud and dust thrown up by the rear wheel WR from attaching to the tail light units 41. Thus, the hugger fender 55, which is arranged below the straightening plate 50 while covering the rear wheel WR from above, can be downsized, since the rear edge 50*a* of the straightening plate 50 is arranged behind the rear edge 55*a* of the hugger fender 55.

Also, the air flow passage 45 allowing air to flow in the longitudinal direction of the vehicle is formed in the rear cowl 40, and the exhaust port 48 of the air flow passage 45 opens toward the rear around the tail light units 41. Thus, running resistance can be reduced even more as indicated by arrow 75 (see FIGS. 7, 8, and 10), by allowing a flow of air to flow through inside the rear cowl 40 in the longitudinal direction of the vehicle. Also, since a flow of air having flowed through the air flow passage 45 is discharged to the rear from around the tail light units 41, mud and dust thrown up by the rear wheel WR are less likely to attach to the tail light units 41, and the visibility of the tail light units 41 can be increased.

Also, the front wall portion 43*c* facing the vehicle front is provided in the rear cowl 40 behind the operator's seat 34, the first intake ports 46 taking air into the air flow passage 45 from the front are formed in the front wall portion 43*c*, the second intake port 47 taking air into the air flow passage 45 from the front is formed in the ceiling wall of the rear cowl 40, behind the first intake ports 46, the total opening area of the first and second intake ports 46, 47 is set larger than the opening area of the exhaust port 48, and the air flow passage 45 is formed such that air flowed in from the first and second intake ports 46, 47 is mixed and discharged from the exhaust port 48. Thus, an accelerated flow of air is discharged to the rear from around the tail light units 41, so that mud and dust thrown up by the rear wheel WR are less likely to attach to the tail light units 41, and the visibility of the tail light units 41 can be increased.

Also, the rear under cover 53 covering the body frame F from below under the operator's seat 34 is connected to the straightening plate 50, in such a manner so as to form the third flow hole 59 with the straightening plate 50, and to form the paired right and left fourth flow holes 60 with the rear cowl 40. Accordingly, a flow of air having passed through the third and fourth flow holes 59, 60 flows below the tail light units 41. Also, the second flow hole 57 is formed in the straightening plate 50, and a flow of air having passed through the second flow hole 57 also flows below the tail light units 41. Thus, mud and dust thrown up by the rear wheel WR are less likely to attach to the tail light units 41, and the visibility of the tail light units 41 can be increased.

Moreover, the power unit P can be cooled effectively, since a flow of air heated by the power unit P is discharged to the rear after flowing through the first to fourth flow holes 49, 57, 59, 60. In addition, the running resistance can be reduced, since a flow of air flows through the first to fourth flow holes 49, 57, 59, 60. Further, the hugger fender 55 can be downsized even more, since airflow discharged to the rear after flowing through the second, third, and fourth flow holes 57, 59, 60 suppresses upwardly splashing of mud and dust from the rear wheel WR.

Further, the pad 35, which can be brought into contact with the lower back of the rider sitting on the operator's seat 34, is provided on the front wall portion 43*c* of the rear cowl 40; and the first intake ports 46 arranged on both sides of the pad 35 are formed in the front wall portion 43*c* behind the front face 35*a* of the pad 35, in such a manner so as to open toward the vehicle front. Thus, even when the lower back of the rider sitting on the operator's seat 34 is in contact with the front face 35*a* of the pad 35, the lower back of the rider does not block the first intake ports 46, and therefore a flow Thus, running resistance can be reduced.

Although the embodiment of the present invention has been described, the invention is not limited to the above embodiment, and various design changes can be made without departing from the invention described in the scope of claims.

For example, although the tail light unit 41 of the above embodiment is configured to include the indicator 42, the indicator may be attached to the license plate bracket. Also, the rear cowl may include a rear lower cowl covering an upper part of the straightening plate 50.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear structure of a motorcycle in which a power unit exerting power for driving a rear wheel is mounted on a body frame, and a tail light unit for emitting light toward the rear of the motorcycle is arranged in a rear cowl, which covers a rear part of said body frame at least behind an operator's seat, comprising:
  - a straightening plate, for covering the rear part of said body frame from below, while allowing air flowing from said power unit to the rear to be straightened and discharged to the rear of the motorcycle, said straightening plate being fixedly arranged below said rear cowl behind said operator's seat, said rear cowl being positioned to cover the rear part of the body frame from a side and from above;
  - an air flow passage allowing air to flow in the longitudinal direction of the motorcycle is formed in said rear cowl; and
  - an exhaust port of the air flow passage opens toward the rear around said tail light unit.

2. The rear structure of a motorcycle according to claim 1, wherein part of a rear edge of said straightening plate is arranged below a rear edge of said tail light unit.

3. The rear structure of a motorcycle according to claim 2, wherein:
  - a hugger fender covering said rear wheel from above is arranged below said straightening plate; and
  - the rear edge of said straightening plate is arranged behind a rear edge of said hugger fender.

4. The rear structure of a motorcycle according to claim 3, wherein a rear under cover covering said body frame from below under said operator's seat is connected to said straightening plate, in such a manner so as to form air flow holes with said straightening plate and said rear cowl.

5. The rear structure of a motorcycle according to claim 2, wherein a rear under cover covering said body frame from below under said operator's seat is connected to said straightening plate, in such a manner so as to form air flow holes with said straightening plate and said rear cowl.

6. The rear structure of a motorcycle according to claim 1, wherein:
  - a front wall portion facing the motorcycle front is provided in said rear cowl behind said operator's seat;
  - a first intake port taking air into said air flow passage from the front is formed in said front wall portion;
  - a second intake port taking air into said air flow passage from the front is formed in a ceiling wall of said rear cowl, behind the first intake port;
  - a total opening area of the first and second intake ports is set larger than an opening area of said exhaust port; and
  - said air flow passage is formed such that air flowed in from the first and second intake ports is mixed and discharged from said exhaust port.

7. The rear structure of a motorcycle according to claim 6, wherein a rear under cover covering said body frame from below under said operator's seat is connected to said straightening plate, in such a manner so as to form air flow holes with said straightening plate and said rear cowl.

8. The rear structure of a motorcycle according to claim 6, wherein:
  - a pad is provided on said front wall portion; and
  - first intake ports arranged on both sides of said pad are formed in said front wall portion behind a front face of said pad, in such a manner as to open toward the motorcycle front.

9. The rear structure of a motorcycle according to claim 1, wherein a rear under cover covering said body frame from below under said operator's seat is connected to said straightening plate, in such a manner so as to form air flow holes with said straightening plate and said rear cowl.

10. A rear structure of a motorcycle comprising:
  - a body frame;
  - a rear cowl operatively mounted on the body frame, said rear cowl covers a rear part of the body frame at least behind an operator's seat;
  - a tail light unit for emitting light toward the rear of the motorcycle being arranged in the rear cowl;
  - a straightening plate, for covering the rear part of said body frame from below, while allowing air flowing from a power unit to the rear to be straightened and discharged to the rear of the motorcycle, said straightening plate being fixedly arranged below said rear cowl behind said operator's seat, said rear cowl being positioned to cover the rear part of the body frame from a side and from above;
  - an air flow passage allowing air to flow in the longitudinal direction of the motorcycle is formed in said rear cowl; and
  - an exhaust port of the air flow passage opens toward the rear around said tail light unit.

11. The rear structure of a motorcycle according to claim 10, wherein part of a rear edge of said straightening plate is arranged below a rear edge of said tail light unit.

12. The rear structure of a motorcycle according to claim 11, wherein:
  - a hugger fender covering said rear wheel from above is arranged below said straightening plate; and
  - the rear edge of said straightening plate is arranged behind a rear edge of said hugger fender.

13. The rear structure of a motorcycle according to claim 10, wherein:

a front wall portion facing the motorcycle front is provided in said rear cowl behind said operator's seat;

a first intake port taking air into said air flow passage from the front is formed in said front wall portion;

a second intake port taking air into said air flow passage from the front is formed in a ceiling wall of said rear cowl, behind the first intake port;

a total opening area of the first and second intake ports is set larger than an opening area of said exhaust port; and said air flow passage is formed such that air flowed in from the first and second intake ports is mixed and discharged from said exhaust port.

14. The rear structure of a motorcycle according to claim 13, wherein:

a pad is provided on said front wall portion; and first intake ports arranged on both sides of said pad are formed in said front wall portion behind a front face of said pad, in such a manner as to open toward the motorcycle front.

15. The rear structure of a motorcycle according to claim 10, wherein a rear under cover covering said body frame from below under said operator's seat is connected to said straightening plate, in such a manner so as to form air flow holes with said straightening plate and said rear cowl.

16. A rear structure of a motorcycle in which a power unit exerting power for driving a rear wheel is mounted on a body frame, and a tail light unit for emitting light toward the rear of the motorcycle is arranged in a rear cowl, which covers a rear part of said body frame at least behind an operator's seat, comprising:

a straightening plate, for covering the rear part of said body frame from below, while allowing air flowing from said power unit to the rear to be straightened and discharged to the rear of the motorcycle, said straightening plate being fixedly arranged below said rear cowl behind said operator's seat, said rear cowl being positioned to cover the rear part of the body frame from a side and from above; and a rear under cover for covering said body frame from below under said operator's seat, said rear under cover being connected to said straightening plate, in such a manner so as to form air flow holes with said straightening plate and said rear cowl.

* * * * *